US010175533B2

(12) United States Patent
Koito et al.

(10) Patent No.: US 10,175,533 B2
(45) Date of Patent: Jan. 8, 2019

(54) DISPLAY DEVICE

(71) Applicant: Japan Display Inc., Minato-ku (JP)

(72) Inventors: Takeo Koito, Tokyo (JP); Yudai Numata, Tokyo (JP)

(73) Assignee: Japan Display Inc., Minato-ku (JP)

( * ) Notice: Subject to any disclaimer, the term of this patent is extended or adjusted under 35 U.S.C. 154(b) by 0 days.

(21) Appl. No.: 15/701,492

(22) Filed: Sep. 12, 2017

(65) Prior Publication Data

US 2018/0074375 A1    Mar. 15, 2018

(30) Foreign Application Priority Data

Sep. 14, 2016 (JP) ................................. 2016-179769

(51) Int. Cl.
*F21V 7/04* (2006.01)
*G02F 1/1335* (2006.01)
*F21V 8/00* (2006.01)

(52) U.S. Cl.
CPC ....... *G02F 1/133615* (2013.01); *G02B 6/005* (2013.01); *G02B 6/0031* (2013.01); *G02B 6/0043* (2013.01); *G02B 6/0055* (2013.01)

(58) Field of Classification Search
CPC ... G02B 6/0023–6/0031; G02B 6/0043; G02B 6/005–6/0056; G02F 1/0063; G02F 1/0311; G02F 1/133615; G02F 2001/133616
USPC ................. 362/602–604, 606–607, 615, 617
See application file for complete search history.

(56) References Cited

U.S. PATENT DOCUMENTS

2017/0031157 A1    2/2017   Koito et al.

FOREIGN PATENT DOCUMENTS

| JP | 2011-253128 | 12/2011 |
| JP | 2017-32644 | 2/2017 |

*Primary Examiner* — Jason M Han
(74) *Attorney, Agent, or Firm* — Oblon, McClelland, Maier & Neustadt, L.L.P.

(57) ABSTRACT

According to one embodiment, a display device includes a display module which emits display light, an optical element which transmits or reflects the display light, a reflective element which retroreflects the display light reflected from the optical element, and a first light-guide which imparts directivity toward the optical element to the display light emitted from the display module.

16 Claims, 10 Drawing Sheets

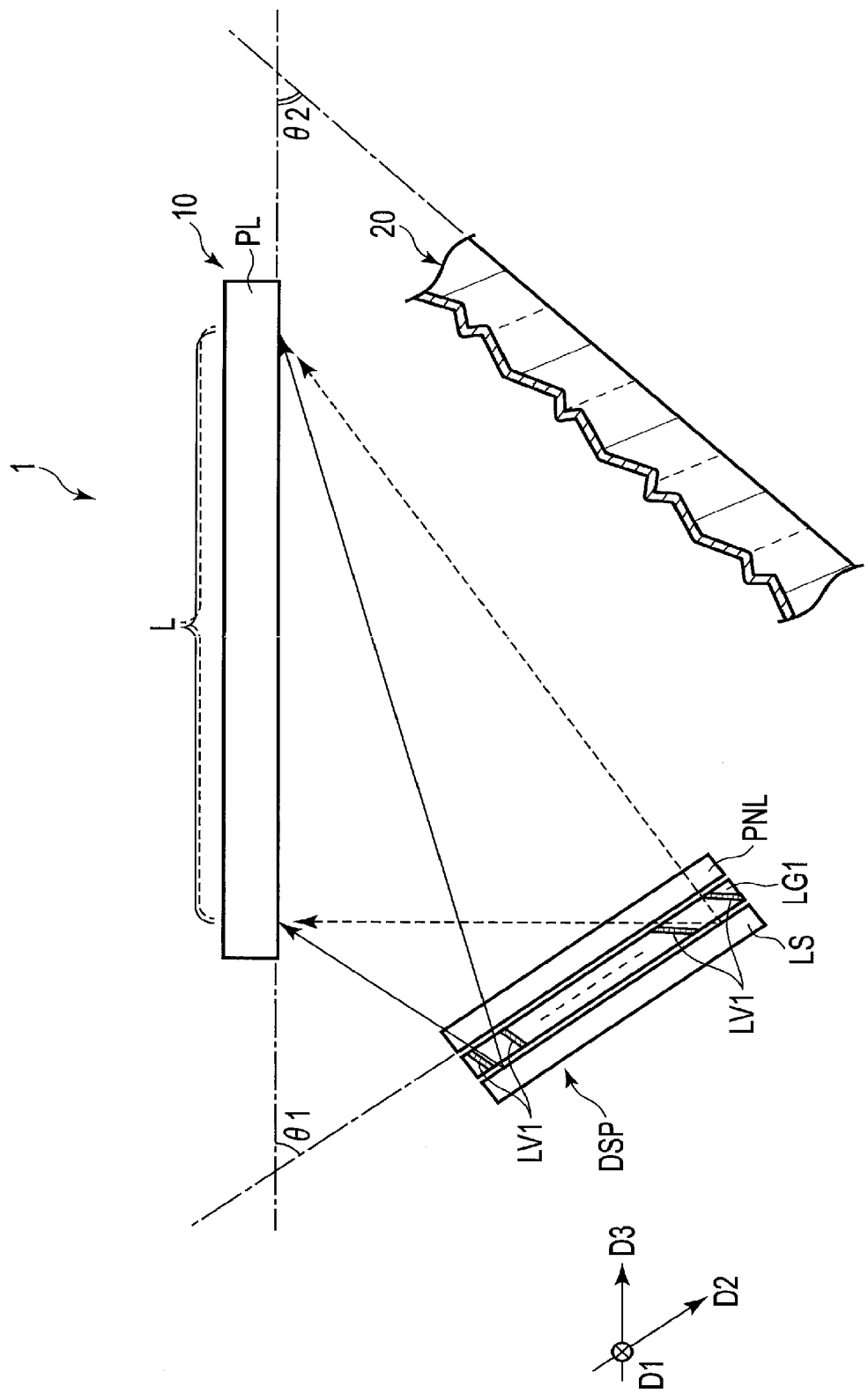
F I G. 5

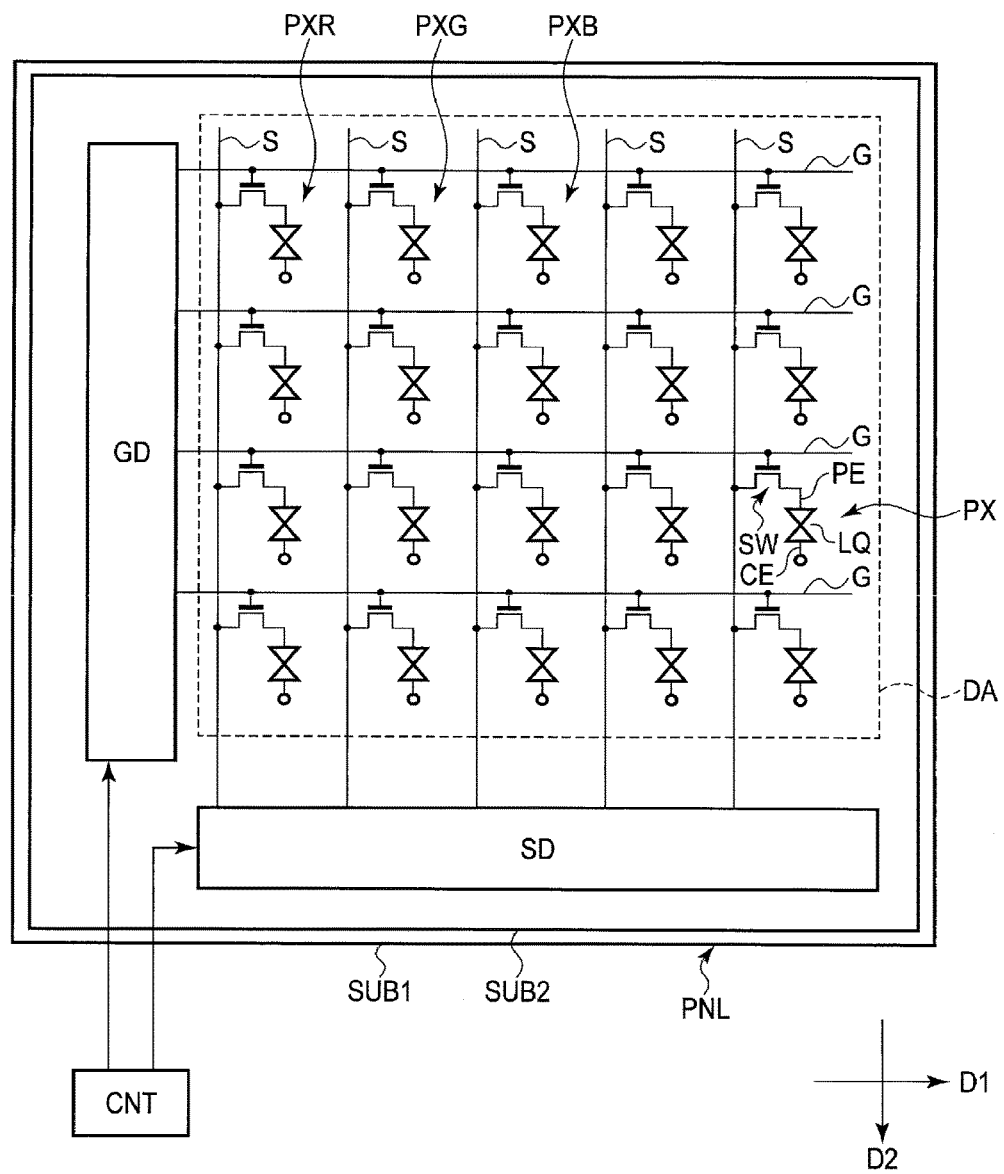
F I G. 9

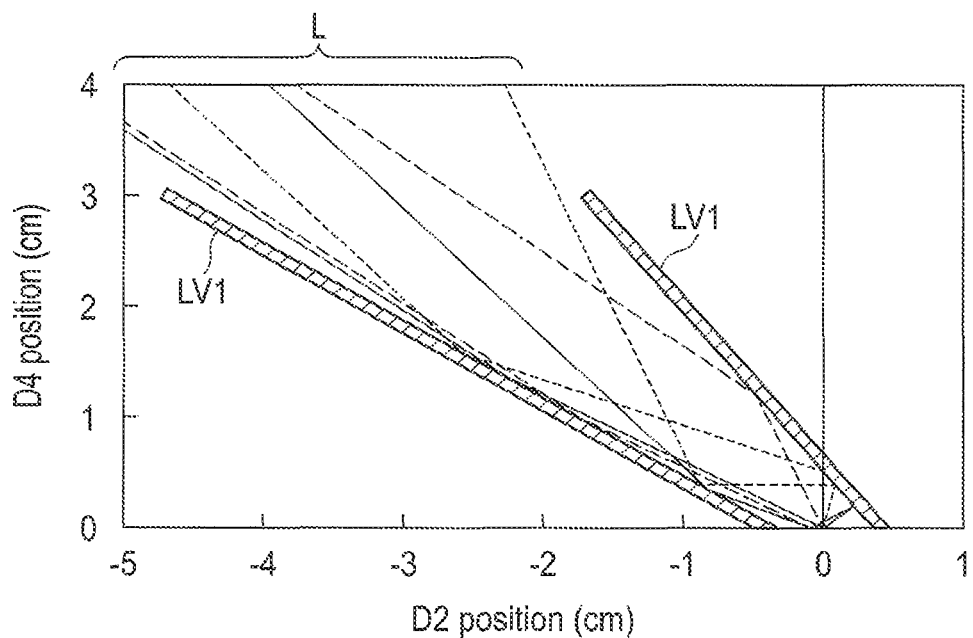
F I G. 13
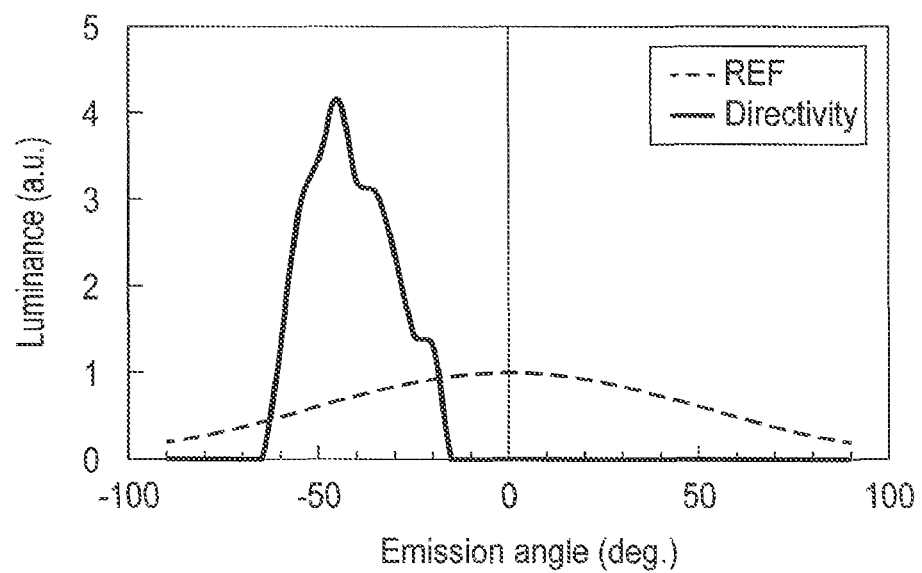
F I G. 14

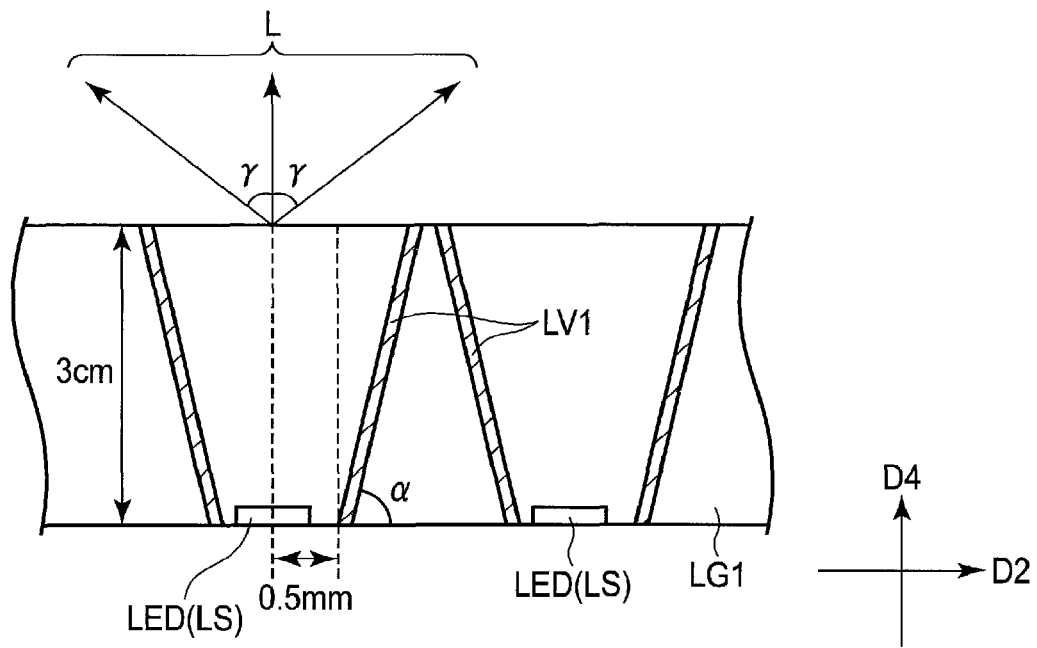
F I G. 15
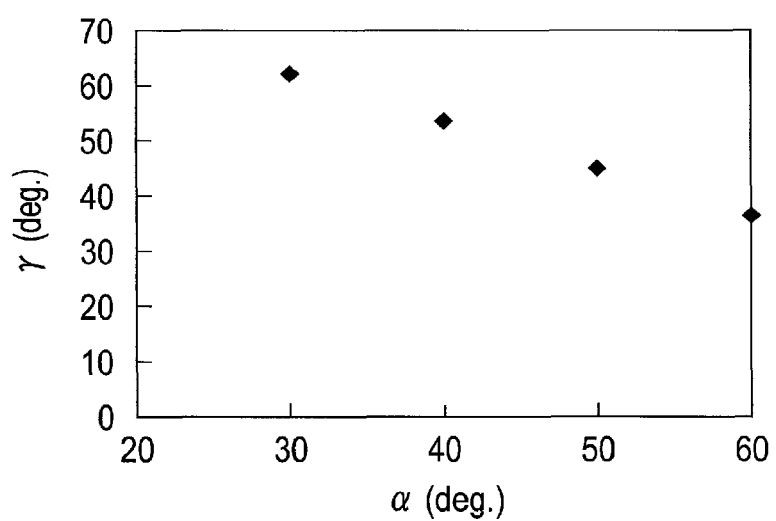
F I G. 16

DISPLAY DEVICE

CROSS-REFERENCE TO RELATED APPLICATIONS

This application is based upon and claims the benefit of priority from Japanese Patent Application No. 2016-179769, filed Sep. 14, 2016, the entire contents of which are incorporated herein by reference.

FIELD

Embodiments described herein relate generally to a display device.

BACKGROUND

As an example of a display device which displays an image in the air, an imaging device by which display light, which is first polarized light, emitted from a display module is regularly reflected by a reflective polarizing filter, the light is changed into second polarized light and retroreflected by a retroreflective portion, the retroreflected light passes through the polarizing filter, and an image is formed at a position symmetrical to the display module with respect to the polarizing filter, is disclosed.

In such an imaging device, stray light which is deviated from an optical path may be a cause of deterioration in display quality.

BRIEF DESCRIPTION OF THE DRAWINGS

FIG. 5 is an illustration showing the directivity of display light L by the light-guide LG1 shown in FIG. 3.

FIG. 9 is an illustration showing a configuration example of a display panel PNL.

FIG. 13 is an illustration showing an example of directivity imparted to the display light L by blades LV1.

FIG. 14 is an illustration indicating the directivity of the display light L illustrated in FIG. 13.

FIG. 15 is an illustration showing an example of emission angle restriction of the display light L by the blades LV1.

FIG. 16 is an illustration showing the relationship between angle γ and angle α shown in FIG. 15.

DETAILED DESCRIPTION

Figure 1:
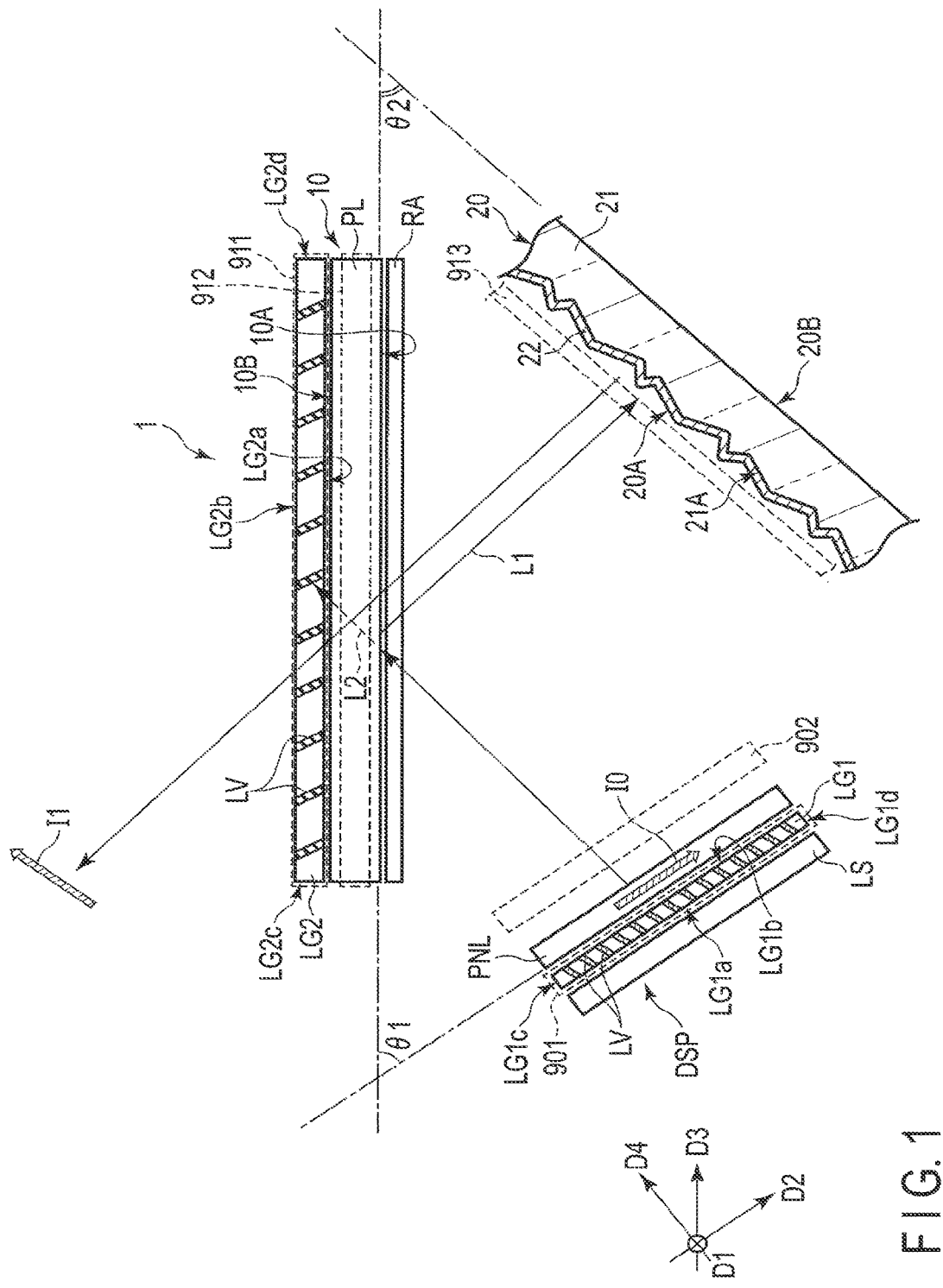
FIG. 1 is an illustration showing a configuration example of a display device 1 according to the present embodiment.

In general, according to one embodiment, a display device includes: a display module which emits display light; an optical element which transmits or reflects the display light; a reflective element which retroreflects the display light reflected from the optical element; and a first light-guide which imparts directivity toward the optical element to the display light emitted from the display module.

According to another embodiment, a display device includes: a display module which emits display light; an optical element which transmits or reflects the display light; a reflective element which retroreflects the display light reflected from the optical element; and a second light-guide which imparts directivity along a direction from the reflective element toward the optical element to the display light which is transmitted through the optical element.

Embodiments will be described hereinafter with reference to the accompanying drawings. The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are illustrated in the drawings schematically, rather than as an accurate representation of what is implemented. However, such schematic illustration is merely exemplary, and in no way restricts the interpretation of the invention. In addition, in the specification and drawings, structural elements which function in the same or a similar manner to those described in connection with preceding drawings are denoted by like reference numbers, and redundant detailed description thereof is omitted unless necessary.

In the present embodiment, although a display module DSP will be described based on a transmissive liquid crystal display device which displays an image by selectively transmitting light incident on a display panel PNL as an example, the display module DSP is not limited to this. For example, the display module DSP may be a reflective liquid crystal display device which displays an image by selectively reflecting light incident on the display panel PNL, or a transflective liquid crystal display device having both transmissive and reflective functions. Further, the display module DSP may be a self-luminous display device which uses an organic or inorganic light-emitting diode (LED) as a pixel, or a display device employing micro-electromechanical systems (MEMS) which controls the reflected light or transmitted light by a mechanical structure. The display module DSP may be a poster or a three-dimensional object.

FIG. 1 is an illustration showing a configuration example of a display device 1 according to the present embodiment.

In the example illustrated, direction D2 is a direction orthogonal to direction D1, and direction D3 is a direction orthogonal to directions D1. Further, direction D4 is a direction orthogonal to directions D1 and D2. However, directions D2 and D3 may intersect direction D1 at an angle other than an orthogonal angle, and direction D4 may also intersect directions D1 and D2 at an angle other than an orthogonal angle.

The display device 1 is an aerial imaging device which forms a display image I1 in the air. A display image I0 displayed on the display module DSP corresponds to a real image of the display image I1. The display image I1 is formed at a position symmetrical to the display image I0 with respect to an optical element 10 assumed as a plane of symmetry. The display device 1 comprises the display module DSP, the optical element 10, a reflective element 20, a light-guide LG (LG1, LG2), etc. The light-guide LG1 corresponds to a first light-guide, and the light-guide LG2 corresponds to a second light-guide.

The display module DSP is configured to emit display light L (L1, L2), and comprises an illumination device LS and the display panel PNL. For example, the illumination device LS is shaped in a rectangle having a pair of edges extending in direction D1, and a pair of edges extending in direction D2. Also, the illumination device LS has a main surface parallel to a D1-D2 plane defined by directions D1 and D2, and emits light from a main surface (irradiation surface) at the side close to the optical element 10. As long as the illumination device LS can emit light to the display panel PNL, the structure is not particularly limited. Although detailed explanation of the illumination device LS is omitted, for example, the so-called edge-light-type backlight comprising an LED on an edge of a light guide plate, and the so-called direct-type backlight comprising an LED directly under a diffusion plate can be applied. Light emitted from the illumination device LS may either be non-polarized natural light or polarized light such as linearly polarized light or circularly (elliptically) polarized light.

In the example illustrated, the display panel PNL is a transmissive liquid crystal display panel, and transmitted light is controlled in units of one pixel by controlling the alignment of a liquid crystal composition by an applied voltage. The display panel PNL is located between the illumination device LS and the optical element 10. The display panel PNL is shaped in a rectangle having edges extending in directions D1 and D2, and is opposed to the illumination device LS in direction D4. A detailed structure of the display panel PNL will be described later.

The optical element 10 transmits or reflects the display light L, and includes a polarizing element PL and a retardation film RA, in the example illustrated. Of the display light L, display light L2 passes through the optical element 10, and display light L1 is reflected by the optical element 10. The optical element 10 includes a main surface parallel to a D1-D3 plane defined by directions D1 and D3, and includes an outer surface 10B which is located on a side closer to the display image I1, and an inner surface 10A which is located on a side opposite to the outer surface 10B. The inner surface 10A faces the display module DSP and the reflective element 20.

The polarizing element PL includes, for example, edges parallel to directions D1 and D3, and a main surface parallel to the D1-D3 plane. The main surface of the polarizing element PL located on the side closer to the display image I1 corresponds to the outer surface 10B. The polarizing element PL is a reflective polarizer including a transmission axis which transmits first linearly polarized light, and being configured to reflect second linearly polarized light orthogonal to the transmission axis. For example, the first linearly polarized light is a P wave parallel to a plane of incidence, and the second linearly polarized light is an S wave perpendicular to the plane of incidence. The polarizing element PL is composed of, for example, a wire-grid polarizing filter, a reflective polarizing film using a brightness enhancement film, or a multi-layered body obtained by overlapping the reflective polarizing film and an absorptive polarizer. If the polarizing element PL is composed of the multi-layered body as described above, the absorptive polarizer is disposed on the reflective polarizing film (i.e., on a side opposite to a side that is opposed to the display module DSP and the reflective element 20), and has a transmission axis parallel to that of the reflective polarizing film. If the polarizing element PL includes the absorptive polarizer, it is possible to suppress reflection of external light incident on the polarizing element PL from the side opposite to the side opposed to the display module DSP, and suppress deterioration in display quality. Also, when the polarizing element PL includes an absorptive polarizer whose degree of polarization is higher than that of a reflective polarizer, a contrast of the display image I1 can be improved.

The retardation film RA is opposed to the polarizing element PL, and is located between the display module DSP and the polarizing element PL, and between the reflective element 20 and the polarizing element PL. The retardation film RA is, for example, arranged to be substantially parallel to the polarizing element PL, and includes a main surface parallel to the D1-D3 plane. The main surface of the retardation film RA on a side closer to the display module DSP and the reflective element 20 corresponds to the inner surface 10A. The retardation film RA is, for example, a $\lambda/4$ plate which imparts a retardation of approximately $\lambda/4$ to the transmitted light. $\lambda$ indicates a wavelength of the transmitted light. The retardation film RA may be a stacked layer body of retardation films having different retardation values and wavelength dispersion properties. For example, the retardation film RA may be structured by combining a $\lambda/2$ plate and a $\lambda/4$ plate in order to reduce the wavelength dependency. Though the specifics will not be described here, the retardation film RA is disposed such that its slow axis intersects a polarization plane of the linearly polarized light incident on the retardation film RA at an angle of 45°. Therefore, when the light passes through the retardation film RA, linearly polarized light is converted into circularly polarized light, and circularly polarized light is converted into linearly polarized light. The circularly polarized light intended here includes elliptically polarized light.

When the optical element 10 is structured by combining the reflective polarizing element PL and the retardation film RA, the display device 1 can improve the efficiency of use of the display light L, and clearness of the display image I1 can be improved. Also, it is possible to prevent the external light which has proceeded into the display device 1 from being reflected by the display module DSP and the reflective element 20 and emitted outside the display device 1, and blurring and glare of the display image I1 caused by the external light can be suppressed. However, the optical element 10 is not limited to a structure including the reflective polarizing element, and may be other types of beam splitters such as a dielectric multilayer film and a half mirror.

In the example illustrated, a metallic thin film 22 forms a retroreflective surface 20A. That is, the reflective element 20 comprises an uneven surface corresponding to the retroreflective surface 20A on the inner side of the display device 1 at which various optical members such as the retardation film are arranged, and comprises a flat surface corresponding to a back surface 20B on the outer side of the display device 1. Note that a surface treatment for preventing corrosion or damage may be applied to the metallic thin film 22. Further, the metallic thin film 22 may be coated with an inorganic material such as silicon nitride (SiN) or an organic material such as light transmissive resin. In this case, the reflective element 20 may include a flat coating surface in area corresponding to the retroreflective surface 20A on the inner side of the display device 1.

When a base 21 is formed of a light reflective material, a surface 21A of the base 21 may form the retroreflective surface 20A. In this case, in a manufacturing process, a step of forming a layer having light reflectivity such as a metallic thin film can be omitted.

A transmittance of the display light L, which enters the reflective element 20 from the optical element 10, on the retroreflective surface 20A is substantially zero, and most of the display light L incident on the retroreflective surface 20A does not reach the back surface 20B of the reflective element 20. In other words, according to the present configuration example, occurrence of a ghost caused by reflection of light at the back surface 20B can be suppressed.

Alternatively, the reflective element 20 may comprise the base 21 on the inner side of the display device 1, and the metallic thin film 22 on the outer side of the display device 1. In this case, the reflective element 20 includes a flat surface (the back surface 20B) on the inner side of the display device 1. Also, in the above case, an uneven surface corresponding to the retroreflective surface 20A is provided on the outer side of the display device 1.

If the base 21 is adjacent to a material having a different refractive index (for example, air) at the surface 21A, the reflective element 20 does not need to include the metallic thin film 22. In this case, since light incident on the reflective element 20 is retroreflected by the interface reflection at the surface 21A of the base 21, the surface 21A corresponds to the retroreflective surface 20A.

The optical element 10 is arranged such that it forms angle θ1 with respect to the display panel PNL. Angle θ1 corresponds to an angle formed between, for example, a main surface of the display panel PNL and the main surface of the polarizing element PL, and corresponds to an angle formed between direction D2 and direction D3. Angle θ1 is not particularly limited as long as the display light L emitted from the display module DSP can enter the optical element 10. In one example, angle θ1 is set to an acute angle greater than 0 degrees and smaller than 90 degrees. If angle θ1 is greater than or equal to 45 degrees and less than 90 degrees, the display light L from the display module DSP can be made incident on the optical element 10 efficiently.

The reflective element 20 is arranged such that it forms angle θ2 with respect to the optical element 10. Angle θ2 corresponds to an angle formed between, for example, the back surface 20B of the reflective element 20 and the main surface of the polarizing element PL. Angle θ2 is not particularly limited as long as the display light L1 reflected from the optical element 10 can enter the retroreflective surface 20A. However, from the standpoint of efficiency of retroreflection at the retroreflective surface 20A, it is preferable that angle θ2 be set to 45° or more and 135° or less, more preferably, 45° or more and less than 90°. Angle θ2 may change depending on a position of measurement of the reflective element 20. In other words, at least a part of the reflective element 20 may be curved.

The light-guide LG1 is an emission angle restriction member which directs the display light L emitted from the display module DSP in a direction of the optical element 10. The light-guide LG1 is arranged at a position 901 or 902. The position 901 is between the illumination device LS and the display panel PNL. The light-guide LG1 arranged at the position 901 imparts directivity to the light traveling from the illumination device LS toward the display panel PNL. The position 902 is a position overlapping a display surface PNLa of the display panel PNL, a position between the display panel PNL and the optical element 10, or a position on a side opposed to the optical element 10 of the display panel PNL. The light-guide LG1 arranged at the position 902 imparts directivity to the display light L emitted from the display panel PNL. The light-guide LG1 may be arranged at both of the positions 901 and 902, or only at one of those positions. Stray light which does not contribute to display and which is reflected at respective portions within the display device 1 causes deterioration in display quality of the display device 1. The display device 1 comprising the light-guide LG1 can suppress occurrence of stray light by restricting emission of light from the display module DSP in the direction of the location of the reflective element 20.

For example, the light-guide LG1 includes main surfaces LG1a and LG1b parallel to the D1-D2 plane. Further, the light-guide LG1 includes side surfaces LG1c and LG1d which extend in direction D4, and are opposed to each other in direction D2. The main surface LG1a is the main surface on a side opposed to the illumination device LS, and corresponds to an element surface of the light-guide LG1. The element surface in this specification refers to a surface of the light-guide LG1, which is at the side where the light enters, and is not necessarily limited to the one corresponding to a substantive plane and may be a virtual plane. In one example, a wall LV and an opening are alternately arranged.

The light-guide LG1 comprises a plurality of walls LV which are arranged at intervals in an in-plane direction of the element surface (in the example illustrated, directions D1 and D2). The wall LV is formed from the main surface LG1a to the main surface LG1b. With respect to the light-guide LG1 arranged at the position 901, the wall LV should preferably be a light-reflecting surface having optical reflectivity. When the wall LV is the light-reflecting surface, it is possible to suppress light loss in the light-guide LG1, and improve the directivity of the display light L1. With respect to the light-guide LG1 arranged at the position 902, the wall LV should preferably be a light-shielding surface having a light-blocking property. When the wall LV is the light-shielding surface, it is possible to suppress glare caused by the reflected light at the light-guide LG1.

The light-guide LG2 is an emission angle restriction member which directs the display light L that passes through the optical element 10 along a direction from the reflective element 20 toward the optical element 10. In the example illustrated, the light-guide LG2 is arranged at a position 911 of the optical element 10, which is opposite to a side opposed to the reflective element 20, and imparts directivity to the display light L that has passed through the optical element 10. However, the light-guide LG2 is not limited to the above. For example, the light-guide LG2 may be arranged at a position 912 within the optical element 10 to impart directivity to the display light L passing through the optical element 10. Alternatively, the light-guide LG2 may be arranged at a position 913, which is at the side of the reflective element 20 opposed to the optical element 10, to impart directivity to the display light L before and after the display light L is retroreflected by the reflective element 20. The light-guide LG2 arranged at the position 911 or 912 prevents the display light L2, which is a part of the display light L emitted from the display module DSP that has not been reflected by the optical element 10, from leaking outside the display device 1, and also prevents the display image I0 from being visually recognized at a position other than where the display image I1 is formed. Also, since the light-guide LG2 blocks the transmitted light of the optical element 10 (i.e., stray light or external light) excluding the display light L1, it is possible to prevent the constituent elements (the display module DSP, the reflective element 20, etc.) inside the display device 1 from being visually recognized by an observer outside the display device 1. The light-guide LG2 arranged at the position 913 prevents the external light, which passes through the optical element 10 and enters the interior of the display device 1, from being retroreflected by the reflective element 20. By this feature, it is possible to prevent the reflective element 20 from being visually recognized by the observer and suppress glare due to the external light. Note that the light-guide LG2 may be arranged at more than one position of the positions 911 to 913, any one of the positions 911 to 913, or all of the positions 911 to 913.

For example, the light-guide LG2 arranged at the position 911 includes main surfaces LG2a and LG2b parallel to the D1-D3 plane. Further, the light-guide LG2 includes side surfaces LG2c and LG2d which are opposed to each other in direction D3. The main surface LG2a is the main surface on a side opposed to the optical element 10, and corresponds to an element surface of the light-guide LG2. The element surface of the light-guide LG2 may also be a virtual plane likewise the element surface of the light-guide LG1.

The light-guide LG2 comprises a plurality of walls LV which are arranged at intervals in an in-plane direction of the element surface (in the example illustrated, directions D1 and D3), likewise the light-guide LG1. Each of the walls LV is formed from the main surface LG2a to the main surface LG2b. The wall LV of the light-guide LG2 should preferably be a light-shielding surface in terms of suppressing glare caused by the reflected light at the light-guide LG2.

As explained above, the display device 1 capable of suppressing deterioration in display quality can be provided according to the present embodiment. Although the display device 1 comprises both of the light-guides LG1 and LG2 in the configuration example, a similar advantage can be obtained even with a structure in which only one of the light-guides LG1 and LG2 is provided.

Figure 2:
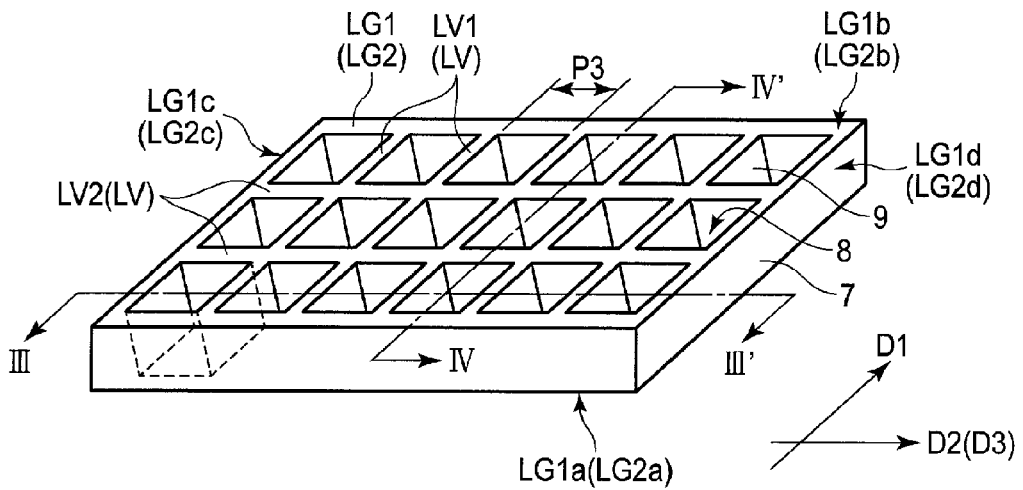
FIG. 2 is an illustration showing a configuration example of a light-guide LG.
Figure 3:
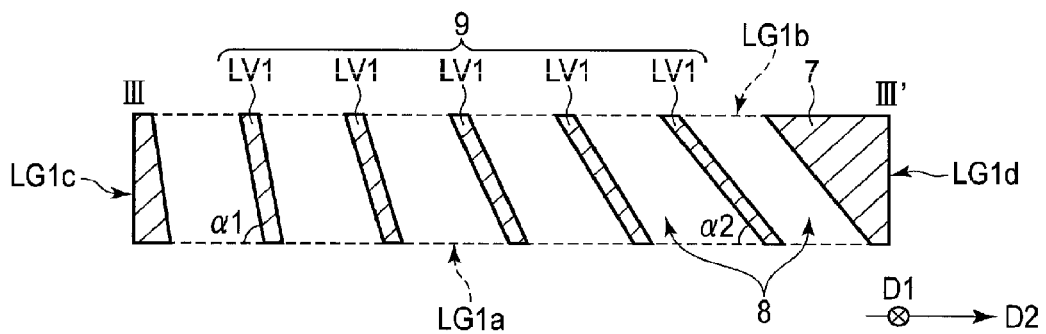
FIG. 3 is a cross-sectional view of a light-guide LG1 taken along line III-III' shown in FIG. 2.
Figure 4:
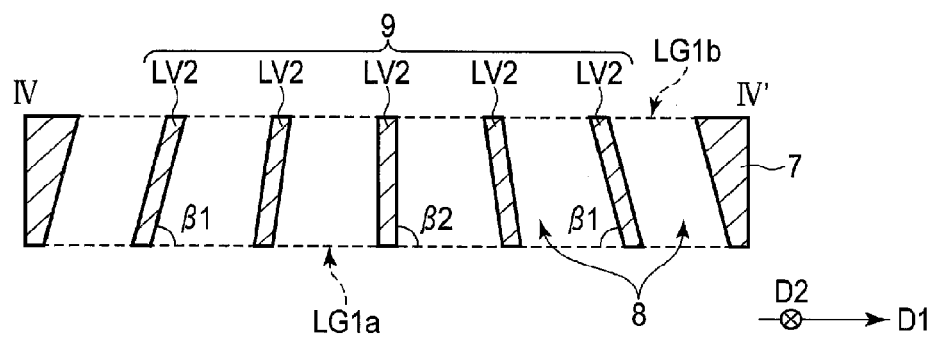
FIG. 4 is a cross-sectional view of the light-guide LG1 taken along line IV-IV' shown in FIG. 2.

Next, a configuration example of these light-guides LG (LG1 and LG2) will be described. Referring to FIGS. 2 to 4, a configuration example of the light-guide LG1 will be described. However, this configuration example can be assumed as a configuration example of the light-guide LG2 by replacing the elements LG1a to LG1d with LG2a to LG2d, and replacing D2 with D3.

FIG. 2 is an illustration showing a configuration example of the light-guide LG.

A plurality of walls LV comprise a plurality of blades LV1 and LV2 which cross each other. For example, the blades LV1 extend in direction D1, and are arranged in direction D2. Further, the blades LV2 extend in direction D2, and are arranged in direction D1. An interval at which the blades LV1 or LV2 are arranged is P3.

The walls LV are formed by providing a plurality of openings 8 in the shape of a quadrangular prism for allowing transmission of light on a rectangular plate material 7 having a predetermined thickness. The openings 8 are arranged in direction D1 and D2. However, the shape of the opening 8 is not limited to the above, and a cross-sectional shape of the opening 8 may be triangular or hexagonal, and the openings 8 may be disposed in a staggered arrangement or honeycomb arrangement. Each of the openings 8 may be space, or may be filled with a resin material which is highly transparent and has a refractive index different from that of the plate material 7. An inner wall surface 9 of the opening 8 corresponds to the wall LV, and a metal reflective film or a light-shielding film, for example, is formed on the inner wall surface 9. A plurality of inner wall surfaces 9 formed of a single opening 8 are opposed to each other in direction D1 and D2. The plate material 7 is formed of a transparent material such as glass, and may be formed of a light reflective or light shielding material. When the plate material 7 is formed of a light reflective or light shielding material, a step of forming a reflective film or a light-shielding film on the inner wall surfaces 9 can be omitted.

FIG. 3 is a cross-sectional view of the light-guide LG1 taken along line III-III' shown in FIG. 2.

The blades LV1 are inclined in a direction of proceeding from the illumination device LS toward the optical element 10 with respect to the element surface (main surface LG1a) between the main surface LG1a and the main surface LG1b. In other words, in the in-plane direction (D1-D2 plane) of the element surface, one end portion of the blade LV1 at the main surface LG1a side is more separated from the side surface LG1c, which is the edge of the light-guide LG1 close to the optical element 10, as compared to the other end portion of the blade LV1 at the main surface LG1b side.

The plurality of blades LV1 are arranged at an acute angle of angles α1 and α2 with respect to the main surface LG1a. Angle α1 is an angle which the blade (first blade) LV1 at a position close to the optical element 10, more specifically, close to the side surface LG1c, forms with the main surface LG1a. Angle α2 is an angle which the blade (second blade) LV1 at a position away from the optical element 10, more specifically, close to the side surface LG1d, forms with the main surface LG1a. Angle α1 is greater than angle α2. However, angles α1 and α2 may be equal to each other, and the plurality of blades LV1 may be inclined with respect to the main surface LG1a at a uniform angle.

FIG. 4 is a cross-sectional view of the light-guide LG1 taken along line IV-IV' shown in FIG. 2.

The blades LV2 are inclined in a direction of proceeding toward a central portion in the in-plane direction with respect to the element surface (main surface LG1a) between the main surface LG1a and the main surface LG1b. In other words, in the in-plane direction (D1-D2 plane) of the element surface, one end portion of the blade LV2 at the main surface LG1a side is closer to the side surface of the light-guide LG1 as compared to the other end portion of the blade LV2 at the main surface LG1b side.

The plurality of blades LV2 are arranged at an acute angle of angles β1 and β2 with respect to the main surface LG1a. Angle β1 is an angle which the blade (fourth blade) LV2 at a position close to the side surface of the light-guide LG1 forms with the main surface LG1a. Angle β2 is an angle which the blade (third blade) LV2 at a position close to the central portion of the main surface LG1a of the light-guide LG1 forms with the main surface LG1a. Angle β2 is greater than angle β1. Further, the blades LV2 have a line symmetrical structure with respect to the blade LV2 positioned at the center in direction D1. That is, angle β1 of the N-th blade LV2 from the side surface indicated as IV in the drawing of the light-guide LG1 is equal to angle β1 of the N-th blade from the side surface indicated as IV' in the drawing of the light-guide LG1. However, angles β1 and β2 may be equal to each other, and the plurality of blades LV2 may be inclined with respect to the main surface LG1a at a uniform angle.

FIG. 5 is an illustration showing the directivity of the display light L by the light-guide LG1 shown in FIG. 3.

In the display module DSP, a range of the emission angle of the display light L which can be made incident on the optical element 10 differs on a side close to the optical element 10 and a side away from the optical element 10. Accordingly, as illustrated in the present figure, by varying an angle of inclination of the blade LV1 with respect to the main surface LG1a in the in-plane direction of the main surface LG1a, on the entire surface of the display module DSP, the display light L can be directed to the optical element 10 efficiently.

Figure 6:
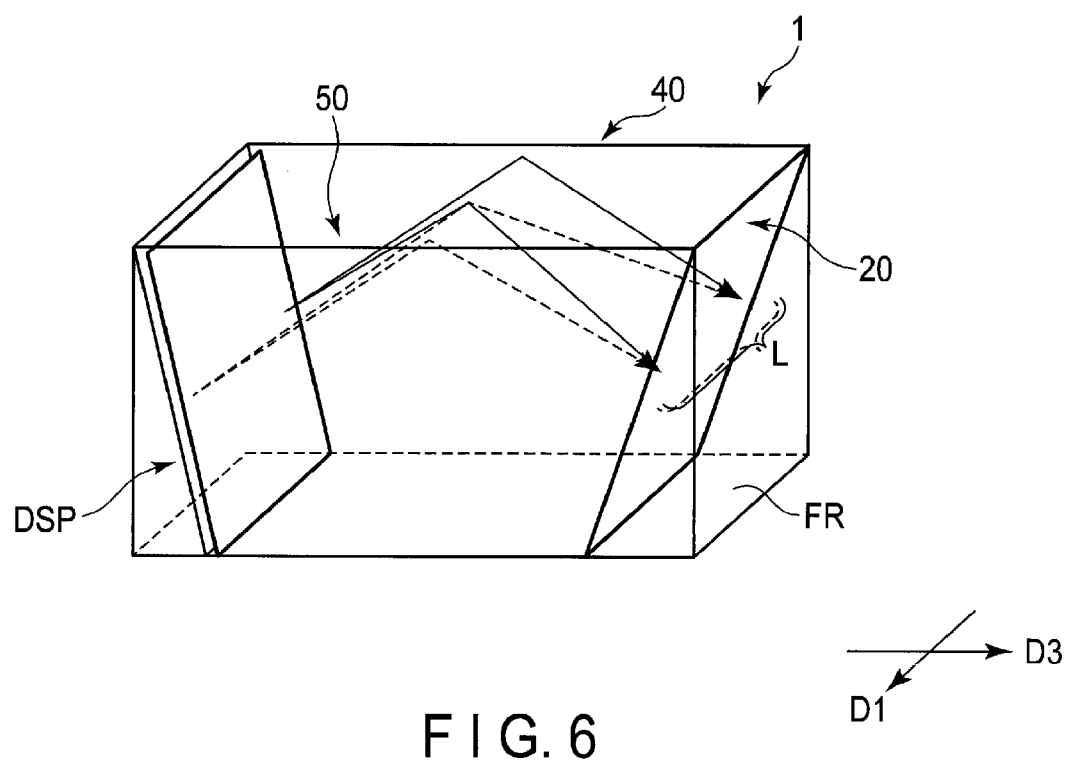
FIG. 6 is an illustration showing the directivity of the display light L by the light-guide LG1 shown in FIG. 4.

FIG. 6 is an illustration showing the directivity of the display light L by the light-guide LG1 shown in FIG. 4.

The display device 1 is accommodated in a box-shaped frame FR, and includes side surfaces 40 and 50 connecting the display module DSP and the reflective element 20. From the standpoint of suppressing stray light inside the display device 1, the side surfaces 40 and 50 include light-shielding inner wall surfaces.

The display light L emitted from a position close to the side surface 40 of the display module DSP has directivity in a direction of approximating the side surface 50 relative to direction D3 by virtue of the structure of the blades LV2. Similarly, the display light L emitted from a position close to the side surface 50 has directivity in a direction of approximating the side surface 40 relative to direction D3. Consequently, a loss caused by the display light L being incident on the side surfaces 40 and 50 can be reduced, and the efficiency of use of light can be improved.

Next, another configuration example of the light-guide LG1 will be described with reference to FIGS. 7 and 8. Note that the following configuration example can also be read as the configuration example of the light-guide LG2.

Figure 7:
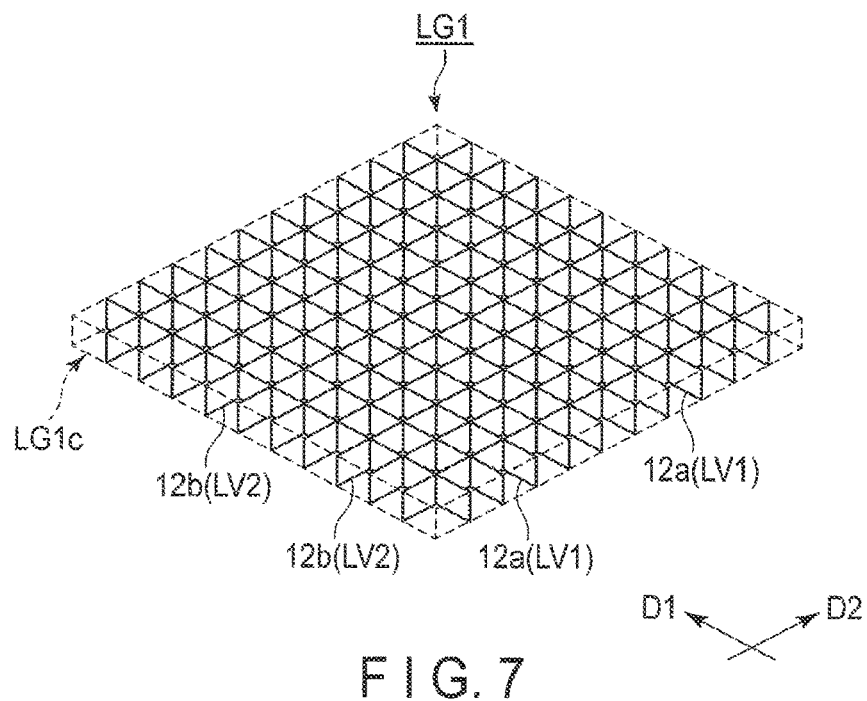
FIG. 7 is an illustration showing another configuration example of the light-guide LG.

FIG. 7 is an illustration showing another configuration example of the light-guide LG.

In the present configuration, the light-guide LG1 is formed by combining plates 12a and 12b each formed as a light-reflecting surface or a light-shielding surface on its both sides or one side in such a way that they intersect each other. A plurality of plates 12a extend in direction D1 and are arranged in direction D2, and correspond to the blades LV1. A plurality of plates 12b extend in direction D2 and are arranged in direction D1, and correspond to the blades LV2. Air may exist in space surrounded by the plates 12a and 12b, or may be filled with a resin material which is highly transparent.

Figure 8:
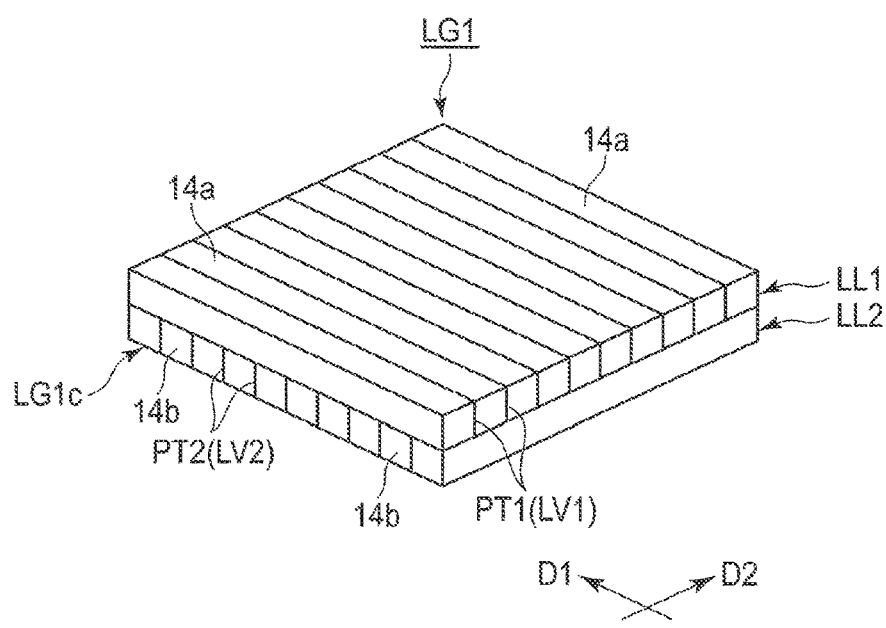
FIG. 8 is an illustration showing yet another configuration example of the light-guide LG.

FIG. 8 is an illustration showing yet another configuration example of the light-guide LG.

The light-guide LG1 comprises a first louver layer LL1 and a second louver layer LL2. The first louver layer LL1 overlaps the second louver layer LL2.

The first louver layer LL1 comprises a plurality of transparent materials 14a. Each of the transparent materials 14a is formed in the shape of a prism extending in direction D1. The plurality of transparent materials 14a are arranged in direction D2. The adjacent transparent materials 14b are arranged such that their light-reflecting surfaces or the light-shielding surfaces face each other. The light-reflecting surface or the light-shielding surface of the transparent material 14a corresponds to a first partition PT1, and functions similarly to the above-described blade LV1.

The second louver layer LL2 comprises a plurality of transparent materials 14b. Each of the transparent material 14b is formed in the shape of a prism extending in direction D2. The plurality of transparent materials 14b are arranged in direction D1. The adjacent transparent materials 14b are arranged such that their light-reflecting surfaces or the light-shielding surfaces face each other. The light-reflecting surface or the light-shielding surface of the transparent material 14b corresponds to a second partition PT2, and functions similarly to the above-described blade LV2.

FIG. 9 is an illustration showing a configuration example of the display panel PNL.

In the example illustrated, the display panel PNL is shaped as a rectangle with end portions extending in directions D1 and D2.

In this specification, an active-matrix-driving transmissive liquid crystal display panel will be described as an example of the display panel PNL. More specifically, the display panel PNL includes a first substrate SUB1, a second substrate SUB2 opposed to the first substrate SUB1, and a liquid crystal layer LQ held between the first substrate SUB1 and the second substrate SUB2. The first substrate SUB1 and the second substrate SUB2 are bonded to each other with a predetermined cell gap formed between the substrates. The display panel PNL includes a display area DA where an image is displayed. The display area DA includes sub-pixels PX arrayed in a matrix.

The display area DA includes, for example, a red pixel PXR which displays red, a green pixel PXG which displays green, and a blue pixel PXB which displays blue, as the sub-pixels PX. It should be noted that the display area DA may further include a sub-pixel of a color different from red, green and blue (for example, a white pixel which displays white). A pixel for realizing color display is constituted of these sub-pixels PX of different colors. That is, the pixel is the minimum unit which constitutes a color image. In the example illustrated, the pixel is constituted of the red pixel PXR, the green pixel PXG, and the blue pixel PXB.

The red pixel PXR includes a red color filter, and is formed to transmit mainly red light of white light from a light source device. The green pixel PXG includes a green color filter, and is formed to transmit mainly green light of the white light from the light source device. The blue pixel PXB includes a blue color filter, and is formed to transmit mainly blue light of the white light from the light source device. Further, though not explained in detail, the color filters may be formed in the first substrate SUB1 or the second substrate SUB2.

The first substrate SUB1 includes gate lines G extending along direction D1, and source lines S extending along direction D2 and intersecting the gate lines G. Each of the gate lines G is drawn outside the display area DA and is connected to a gate driver GD. Each of the source lines S is drawn outside the display area DA and is connected to a source driver SD. The gate driver GD and the source driver SD are connected to a controller CNT. The controller CNT generates a control signal, on the basis of a video signal, to control the gate driver GD and the source driver SD.

Each of the sub-pixels PX includes a switching element SW, a pixel electrode PE, a common electrode CE, etc. The switching element SW is electrically connected to the gate line G and the source line S. The switching element SW is composed of, for example, a thin-film transistor. The pixel electrode PE is electrically connected to the switching element SW. The common electrode CE is opposed to each of a plurality of pixel electrodes PE.

Although the details of the configuration of the display panel PNL will not be described here, in a display mode using a longitudinal electric field formed along the normal of a substrate main surface or a display mode using an oblique electric field which is tilted obliquely with respect to the normal of the substrate main surface, the pixel electrode PE is disposed in the first substrate SUB1 while the common electrode CE is disposed in the second substrate SUB2. In addition, both the pixel electrode PE and the common electrode CE are disposed in the first substrate SUB1 in a display mode using a lateral electric field formed along the substrate main surface. Furthermore, the display panel PNL may have a structure corresponding to a display mode using an arbitrary combination of the longitudinal, lateral, and oblique electric fields. Note that in the example illustrated, the substrate main surface corresponds to the D1-D2 plane.

Figure 10:
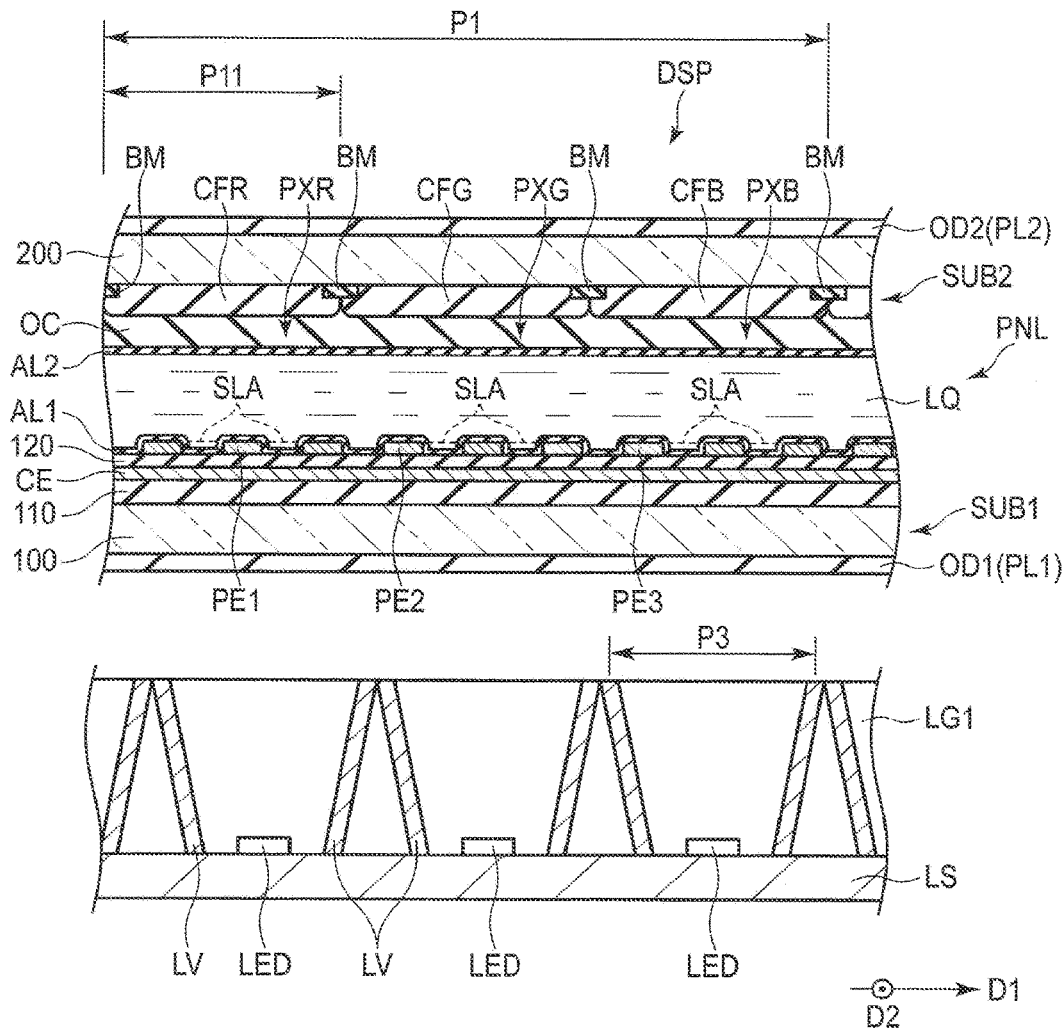
FIG. 10 is a cross-sectional view showing a configuration example of a display module DSP.

FIG. 10 is a cross-sectional view showing a configuration example of the display module DSP.

A cross-sectional structure of the display panel PNL adopting a fringe field switching (FFS) mode which is one of the display modes using the lateral electric field will be explained briefly.

The first substrate SUB1 includes a first insulating substrate 100, a first insulating film 110, the common electrode CE, a second insulating film 120, pixel electrodes PE1 to PE3, a first alignment film AL1, etc. The common electrode CE extends over the red pixel PXR, the green pixel PXG, and the blue pixel PXB. Each of the pixel electrode PE1 of the red pixel PXR, the pixel electrode PE2 of the green pixel PXG, and the pixel electrode PE3 of the blue pixel PXB is opposed to the common electrode CE, and includes slits SLA. In the example illustrated, the common electrode CE is located between the first insulating film 110 and the second insulating film 120, and the pixel electrodes PE1 to PE3 are located between the second insulating film 120 and the first alignment film AL1. Alternatively, the pixel electrodes PE1 to PE3 may be located between the first insulating film 110 and the second insulating film 120, and the common electrode CE may be located between the second insulating film 120 and the first alignment film AL1. In this case, the slits SLA are formed in the common electrode CE.

The second substrate SUB2 includes a second insulating substrate 200, a light-shielding layer BM, color filters CFR, CFG and CFB, an overcoat layer OC, a second alignment film AL2, etc. The color filters CFR, CFG and CFB are opposed to the pixel electrodes PE1 to PE3, respectively, with the liquid crystal layer LQ interposed between the color filters and the pixel electrodes. The color filter CFR is a red color filter, the color filter CFG is a green color filter, and the color filter CFB is a blue color filter. Note that, although the color filters CFR, CFG and CFB are formed in the second substrate SUB2 in the example illustrated, they may be formed in the first substrate SUB1. The liquid crystal layer LQ is sealed between the first alignment film AL1 and the second alignment film AL2.

A first optical element OD1 including a first polarizer PL1 is disposed on an outer surface of the first insulating substrate 100. A second optical element OD2 including a second polarizer PL2 is disposed on an outer surface of the second insulating substrate 200. For example, a first absorption axis of the first polarizer PL1 and a second absorption axis of the second polarizer PL2 are orthogonal to each other.

The pixels each composed of the red pixel PXR, the green pixel PXG, and the blue pixel PXB are arrayed at a pitch P1. The sub-pixels PXR, PXG, and PXB are arrayed at a pitch P11.

The illumination device LS is opposed to the first substrate SUB1. While various types of illumination devices can be applied as the illumination device LS, in the configuration example illustrated, a direct-type backlight unit comprising a plurality light sources LED opposed to the display panel PNL is applied. At a side of the illumination device LS which is opposed to the display panel PNL, the light-guide LG1 is arranged. The walls LV of the light-guide LG1 are arranged to surround the respective light sources LED in the D1-D2 plane. In the light-guide LG1, the opening is formed in an inverse tapered shape, that is, an opening on a side close to the illumination device LS is smaller than an opening on a side close to the display panel PNL. A pitch P3 of the opening of the light-guide LG1 on the side close to the display panel PNL is smaller than the pitch P1, for example. By this feature, the display device 1 can suppress deterioration in display quality which results from non-uniformity in luminance in the in-plane direction of the display light L1.

Next, a structure of the retroreflective surface of the reflective element 20 will be described. While the so-called corner reflector structure having three reflective surfaces that are orthogonal to each other is described in the present specification, the structure of the reflective element 20 is not particularly limited. That is, a retroreflective element having a spherical reflective surface, for example, may alternatively be used.

Figure 11:
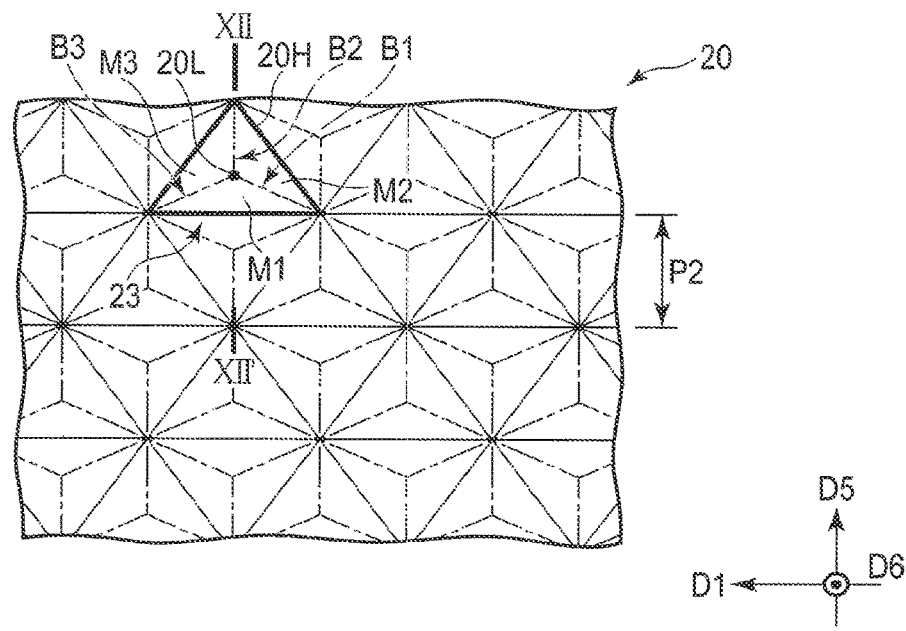
FIG. 11 is an illustration showing a configuration example of a reflective element 20.

FIG. 11 is an illustration showing a configuration example of the reflective element 20.

This figure illustrates the retroreflective surface 20A as seen in planar view. The retroreflective surface 20A extends in a D1-D5 plane defined by directions D1 and D5 crossing each other. Although directions D1 and D5 are orthogonal to each other in the example illustrated, they may cross each other at an angle other than 90°. Further, direction D6 is a normal direction of the D1-D5 plane.

The reflective element 20 comprises a plurality of reflectors 23. In the plan view illustrated, each of the reflectors 23 is shaped in a regular triangle. A top part 20H is located at each of three sides surrounding an area corresponding to the reflector 23, and a bottom part 20L is located at the center of the reflector 23. The bottom part 20L is recessed toward the back of the plane of the drawing, and the reflector 23 comprises three reflective surfaces M1 to M3 which extend radially from the bottom part 20L. Each of the reflective surfaces M1 to M3 is located in a triangular region formed by connecting one side of the top parts 20H extending in a direction different from the extending directions of the other sides and the bottom part 20L.

The reflective surfaces M1 to M3 are all formed in the same shape, and are adjacent to each other. For example, the reflective surfaces M1 and M2 are adjacent to each other at a boundary B1, and are symmetric with respect to the boundary B1. The reflective surfaces M2 and M3 are adjacent to each other at a boundary B2 extending in direction D5, and are symmetric with respect to the boundary B2. The reflective surfaces M3 and M1 are adjacent to each other at a boundary B3, and are symmetric with respect to the boundary B3. Each of the reflective surfaces M1 to M3 has a right-angled corner portion at the bottom portion 201. Also, these reflective surfaces M1 to M3 are orthogonal to each other. The retroreflective surface 20A constituted of the reflective surfaces M1 to M3 of such a shape is called a corner cube or a corner reflector. An air layer, or a protection member which protects the reflective surfaces M1 to M3 is located at an inner side surrounded by the three reflective surfaces M1 to M3. In the reflector 23, since incident light is reflected by each of the three reflective surfaces M1 to M3, retroreflection, which is that the light is reflected back in substantially the same optical path as that of the incident light, is realized.

In the example illustrated, the reflectors 23 are arrayed in direction D1. The reflectors 23 are also arrayed at a pitch P2 in direction D5. However, the reflectors 23 adjacent to each other in directions D1 and D5 have shapes inverted relative to each other by 180 degrees.

The resolution of the display image I1 depends on the pitch P2 of the reflector 23. In order to suppress deterioration in the resolution, the pitch P2 should desirably be smaller than the pitch P1 of the pixels in the display panel PNL shown in FIG. 10.

Figure 12:
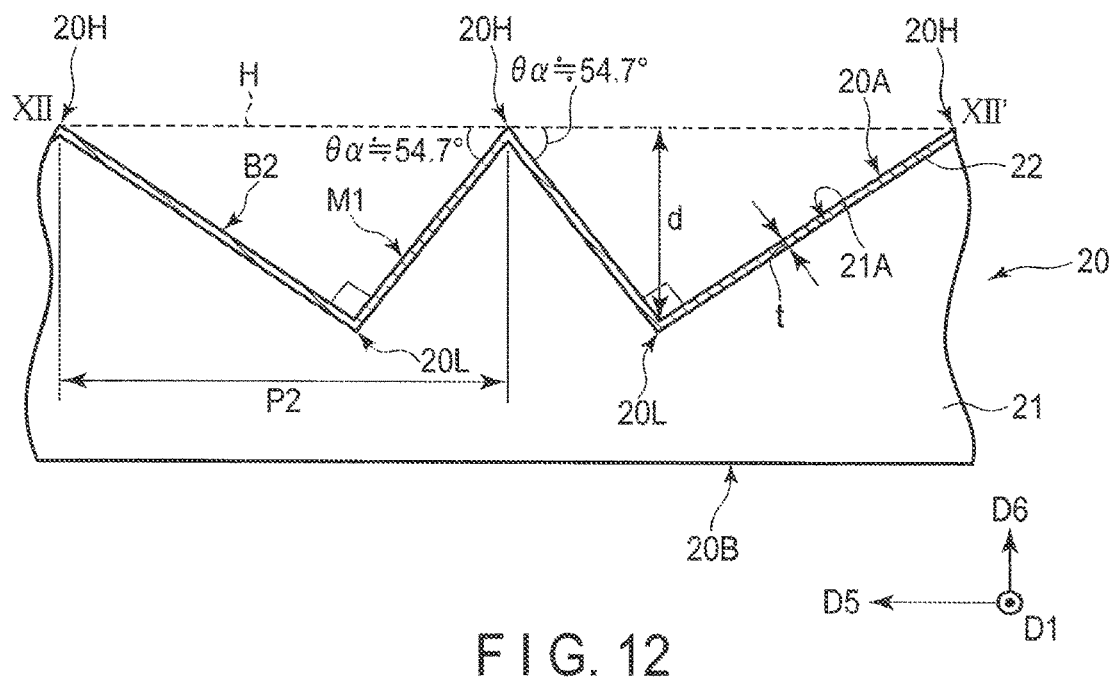
FIG. 12 is a cross-sectional view of the reflective element 20 taken along line XII-XII' shown in FIG. 11.

FIG. 12 is a cross-sectional view of the reflective element 20 taken along line XII-XII' shown in FIG. 11.

In the example illustrated, the top parts 20H are located at a more interior side of the display device 1 than the bottom part 20L. The corner reflector formed by the reflective surfaces M1 to M3 of the retroreflective surface 20A is recessed relative to a horizontal plane H shown by a broken line in the figure (i.e., a plane parallel to the D1-D5 plane). The horizontal plane H is a plane including the top parts 20H. The bottom part 20L is located closer to a back surface 20B than the horizontal plane H. However, if the base material 21 is structured to be located at the inner side of the display device 1, it is possible to assume that the corner reflector is projected relative to the horizontal plane H. In other words, when the base material 21 is located at the inner side of the display device 1, the bottom part 20L is located at a more interior side of the display device 1 than the top parts 20H. A cross-section defined by the horizontal plane H and the retroreflective surface 20A represents a right-angled triangle. An angle formed between the reflective surface M1 and the boundary B2 is 90°, and the horizontal plane H corresponds to the hypotenuse. Angle θα formed between the reflective surface M1 and the horizontal plane H is about 54.7°.

In one example, when the pixel pitch P1 in the display panel PNL is 200 μm, the retroreflector pitch P2 in the reflective element 20 is 180 μm, which means that the pitch P2 is smaller than the pitch P1. Also, the retroreflective surface 20A has a depth d in direction D6 corresponding to the normal direction of the horizontal plane H. The depth d is, for example, 73.5 μm. Note that a thickness t of the metallic thin film 22 is substantially uniform over the entire surface of the retroreflective surface 20A, and is sufficiently small as compared to the depth d. In one example, the thickness t is 150 nm. For this reason, when the metallic thin film 22 is formed, the surface 21A of the base material 21 conforming to the retroreflective surface 20A cannot be buried by the metallic thin film 22 or deform the retroreflective surface 20A.

FIG. 13 is an illustration showing an example of directivity imparted to the display light L by the blades LV1.

FIG. 13 schematically illustrates an example of directivity imparted by the light-guide LG1 in the configuration example of FIG. 10. The horizontal axis represents a position in direction D2, and the vertical axis represents a position in direction D4. It is assumed that a position of the light source LED in direction D2 is 0 cm, a width of the opening of the light-guide LG1 on the side close to the illumination device LS in direction D2 is 1 cm, and a width of the opening on the side close to the display panel PNL in direction D2 is 3 cm. The two blades LV1 which are opposed to each other in direction D2 have a height of 3 cm in direction D4, and one of the blades LV1 is inclined by 2 cm in direction D2, and the other blade LV2 is inclined by 4 cm in direction D1.

FIG. 14 is an illustration indicating the directivity of the display light L illustrated in FIG. 13.

FIG. 14 is a graph of a luminance distribution of light obtained after light emitted from the illumination device LS has passed through the light-guide LG1 where front luminance of the illumination device LS when no light-guide LG1 is arranged is assumed as 1. In this graph, the horizontal axis represents an emission angle, and the vertical axis represents the luminance. In the present structure, light which has passed through the light-guide LG1 has directivity having a peak at −45° with respect to the normal direction of the element surface of the light-guide LG1. Further, the maximum luminance in the present configuration example is the quadruple of the maximum luminance when the light is not passed through the light-guide LG1. Accordingly, the display device 1 can improve the luminance of the display image I1.

Next, the relationship between the height and angle α of the wall LV and angle γ corresponding to the emission angle of light from the light-guide LG1 will be described.

FIG. 15 is an illustration showing an example of emission angle restriction of the display light L by the blades LV1.

This figure illustrates an example of a specific value, such as a height, of the wall LV in the configuration example shown in FIG. 10.

It is assumed that the height of the blade LV1 in direction D4, which is the normal direction with respect to the element surface of the light-guide LG1, is 3 cm. Further, it is assumed that the light source LED is located at the center of the opening of the light-guide LG1 on the side close to the illumination device LS, and the center of the light source LED is positioned at 0.5 mm away from the blade LV1. Angle α is the angle of the blade LV1 with respect to the element surface, and angle γ is the maximum emission angle of light with respect to the normal direction of the element surface.

FIG. 16 is an illustration showing the relationship between angle γ and angle α shown in FIG. 15.

In a graph shown in this figure, the horizontal axis represents angle α, and the vertical axis represents angle γ. The greater the angle α is, the more the angle γ is restricted.

As explained above, according to the present embodiment, a display device capable of suppressing deterioration in display quality can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
a display module which emits display light;
an optical element which transmits or reflects the display light;
a reflective element which retroreflects the display light reflected from the optical element; and
a first light-guide which imparts directivity toward the optical element to the display light emitted from the display module.

2. The display device of claim 1, wherein:
the display module comprises an illumination device and a display panel;
the first light-guide is located between the illumination device and the display panel, or on a display surface side of the display panel; and
the first light-guide comprises a plurality of walls which are arranged at intervals in an in-plane direction parallel to a main surface of the first light-guide.

3. The display device of claim 2, wherein
the plurality of walls comprise a first blade and a second blade extending in a first direction, and being arranged in a second direction intersecting the first direction, and a third blade and a fourth blade intersecting the first blade and the second blade, respectively, and being arranged in the first direction.

4. The display device of claim 3, wherein each of an angle formed between the first blade and the main surface, and an angle formed between the second blade and the main surface is an acute angle.

5. The display device of claim 3, wherein:
the first blade is closer to the optical element than the second blade is; and
an angle formed between the first blade and the main surface is greater than an angle formed between the second blade and the main surface.

6. The display device of claim 3, wherein:
the third blade is closer to a central portion of the main surface than the fourth blade is; and
an angle formed between the fourth blade and the main surface is smaller than an angle formed between the third blade and the main surface.

7. The display device of claim 2, wherein:
the first light-guide is located between the illumination device and the display panel; and
the plurality of walls are light-reflecting surfaces.

8. The display device of claim 2, wherein:
the first light-guide is located on the display surface side of the display panel; and
the plurality of walls are light-shielding surfaces.

9. The display device of claim 2, wherein
the first light-guide comprises a first louver layer, and a second louver layer overlapping the first louver layer, and
the plurality of walls include:
a plurality of first partitions which are located in the first louver layer, extend in a first direction, and are arranged in a second direction intersecting the first direction; and
a plurality of second partitions which are located in the second louver layer, extend in the second direction, and are arranged in the first direction.

10. The display device of claim 1, further comprising a second light-guide which imparts directivity along a direction from the reflective element toward the optical element to the display light which is transmitted through the optical element.

11. A display device comprising:
a display module which emits display light;
an optical element which transmits or reflects the display light;
a reflective element which retroreflects the display light reflected from the optical element; and
a second light-guide which imparts directivity along a direction from the reflective element toward the optical element to the display light which is transmitted through the optical element.

12. The display device of claim 11, wherein:
the second light-guide is located on the optical element opposite to a side that is opposed to the reflective element, or inside the optical element; and
the second light-guide comprises a plurality of walls which are arranged at intervals in an in-plane direction parallel to a main surface of the second light-guide.

13. The display device of claim 12, wherein
the plurality of walls comprise a first blade and a second blade extending in a first direction, and being arranged in a second direction intersecting the first direction, and a third blade and a fourth blade intersecting the first blade and the second blade, respectively, and being arranged in the first direction.

14. The display device of claim 13, wherein each of an angle formed between the first blade and the main surface, and an angle formed between the second blade and the main surface is an acute angle.

15. The display device of claim 12, wherein the plurality of walls are light-shielding surfaces.

16. The display device of claim 12, wherein
the second light-guide comprises a first louver layer, and a second louver layer overlapping the first louver layer, and
the plurality of walls include:
a plurality of first partitions which are located in the first louver layer, extend in a first direction, and are arranged in a second direction intersecting the first direction; and
a plurality of second partitions which are located in the second louver layer, extend in the second direction, and are arranged in the first direction.

* * * * *